Patented Jan. 23, 1945

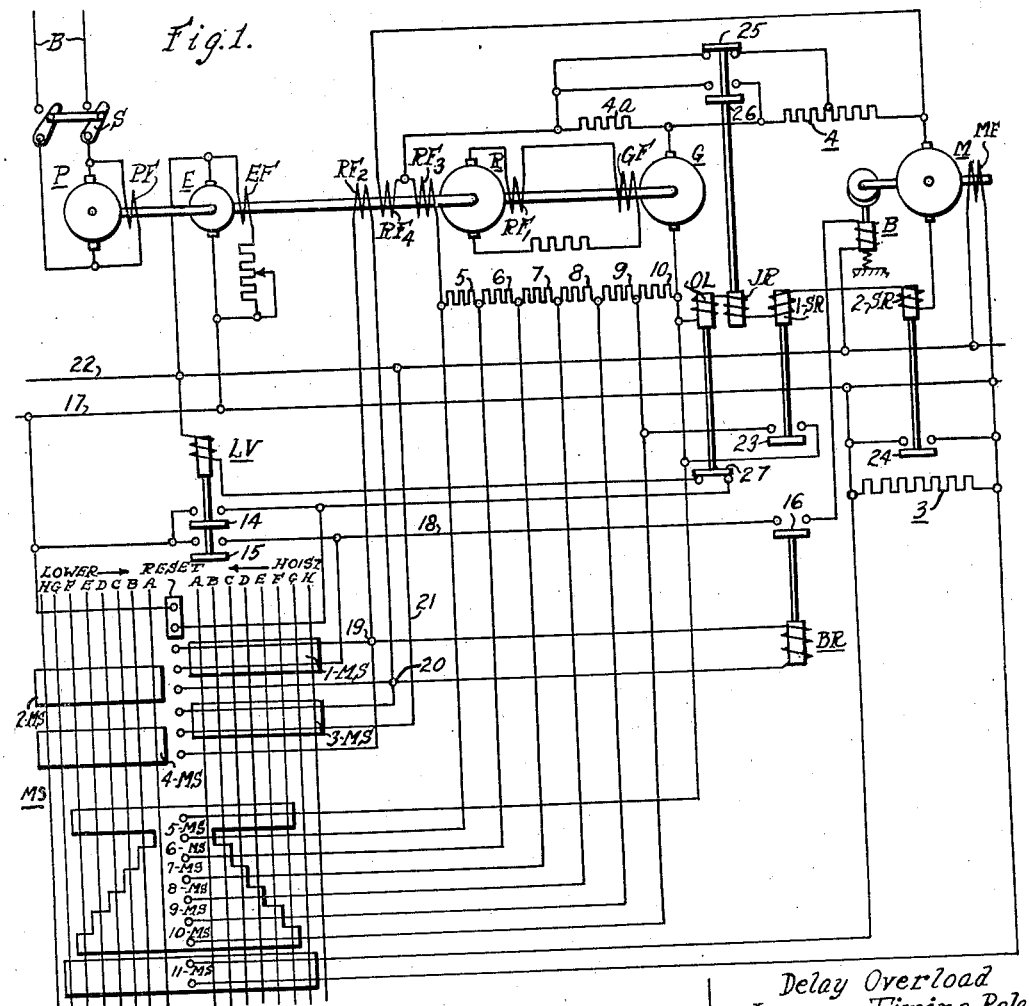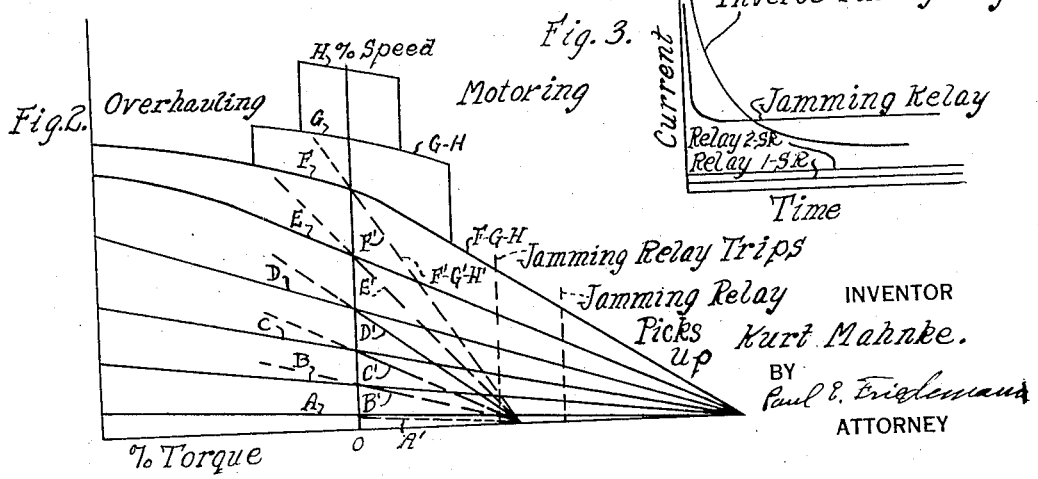

2,367,956

UNITED STATES PATENT OFFICE 2,367,956

MOTOR CONTROL SYSTEM

Kurt Mahnke, Forest Hills, Pa., assignor to Westinghouse Electric & Manufacturing Company, East Pittsburgh, Pa., a corporation of Pennsylvania Application November 20, 1943, Serial No. 511,037

10 Claims. (Cl. 172—239)

The present invention relates to motor control systems, and particularly to such systems for controlling motors operating winches such as cargo winches, towing winches, mining hoists, cranes and the like.

Generally stated the present invention is a direct current variable voltage motor control system employing a direct-current motor and a system of generators and other control devices for regulating the voltage supply for the motor. The generators are adapted to be driven by any suitable prime mover having the characteristic of operating at a constant speed, for example, an A. C. motor, a D. C. motor, a Diesel engine or a turbine. The advantages afforded by direct-current variable voltage motor control in winch applications are, of course, well known in the art. Systems of this type are normally provided with a manual control for effecting changes in the motor output. With manual control, however, the possibilities of overloading either the electrical or mechanical elements of the system are fairly great when heavy loads are being moved and the present invention is intended to provide automatic control of the motor at predetermined torque and speed characteristics when overload conditions are present. This invention is further intended to provide certain improvements in the variable voltage control system whereby a maximum degree of flexibility in controlling a motor operating a winch is obtained so that the entire range of speed from no load to full load may be readily kept under control in both the heaving in and paying out directions of operation.

A principal object of the present invention is to provide a system of control, for a direct-current motor in which the operating characteristic and direction of rotation of the motor, over a preselected range of operating characteristics, are automatically controlled in accordance with the specific load conditions.

A broad object of the present invention is to provide a system of control for a direct-current motor the speed of which is automatically regulated in accordance with the magnitude of the motor armature currents for any preselected speed range of the motor.

Another broad object of the present invention is to provide a system of control for a direct-current motor in which a predetermined direction of motor rotation is automatically effected under overload conditions.

A specific object of the present invention is to provide a motor control system having a main generator for supplying the motor in which a plurality of electromagnetic devices responsive to motor armature currents regulate the degree of excitation of the field windings of the main generator and the motor.

Another specific object of the invention is to provide, in a system of the character referred to, a pair of electromagnetic devices operable under predetermined conditions to regulate the degree of excitation of the field winding of the main generator and thereby control the torque produced by the motor.

Other objects and advantages will become apparent from a study of the following specification when considered in conjunction with the accompanying drawings, in which:

Figure 1 is a schematic diagram of a direct current variable voltage motor control system embodying the principles of this invention.

Fig. 2 is a set of curves graphically illustrating the operating characteristics of a motor which is controlled according to the teachings of this invention;

Figure 4:
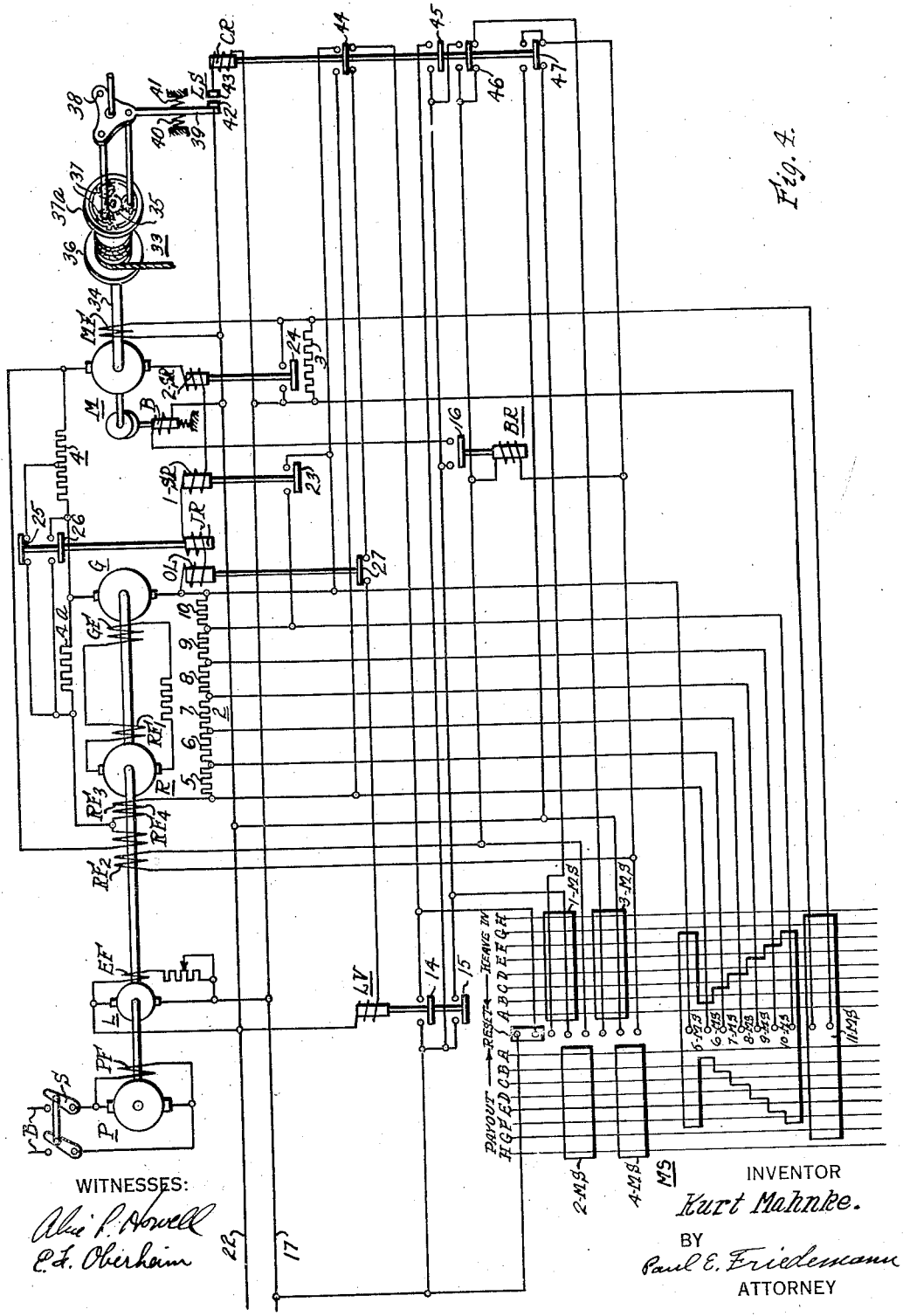

Fig. 3 graphically illustrates the operating characteristics of certain of the control elements used in the variable voltage control system; and Fig. 4 is a modification of the control system illustrated in Fig. 1.

Referring now to Fig. 1, the control system comprises a direct-current motor M for operating a winch (not shown), the main direct-current generator G which supplies the motor M, a regulating generator R for controlling the excitation of the generator G, an exciter E and a prime mover P which as illustrated is a direct current motor but which may be any suitable constant speed prime mover. The prime mover P is supplied by a suitable source of direct-current potential generally denoted by the busses B. The generator G, the regulating generator R and the exciter E are connected to be driven by the prime mover P.

The motor M is provided with a separately excited field winding MF which receives its excitation from the exciter E. Generator G has a separately excited field winding GF connected in series with the regulating generator armature through the regulating generator series field $RF_1$. The other field windings of the regulating generator are the separately excited or pattern field winding $RF_2$ and fields $RF_3$ and $RF_4$ which are differentially wound with respect to the field $RF_2$. The separately excited regulator field $RF_2$ termed a pattern field is energized by the exciter E at a constant potential and is adapted to have its polarity reversed through the master switch contacts 1—MS, 2—MS, 3—MS and 4—MS for reversing the excitation of the generator field GF and consequently reversing the motor M. RF₃ is excited by the potential across the terminals of the generator G and the degree of excitation being controlled by the master switch MS which inserts or removes portions of the field control resistor 2 for either heaving in or paying out operations. RF₄ is excited by the drop across resistor 4 and its excitation consequently varies with varying motor armature currents. Its excitation is further controlled under overload conditions by means of the jamming relay JR which is adapted to energize the field RF₄ with the full voltage drop across resistance 4 when the motor torque overloads the winch. For the winch application, it is preferred to lower the motor speed as the load is increased so that the characteristics of a series motor are approached. This is accomplished by connecting the field RF₄ to add its polarity to the field RF₃. Thus with increasing motor armature currents the excitation of field RF₄ increases reducing the output of the regulator generator and consequently the output of the main generator. This gives a drooping characteristic to the generated voltage for the winch motor circuit as the applied load increases during heaving in operations. This same condition is maintained during paying out with overhauling loads except at the higher speed ranges where magnetic saturation occurs. The effects on the torque speed characteristics of the motor which this voltage control produces are illustrated in Fig. 2. The exciter E and the prime mover P are respectively provided with shunt field windings EF and PF.

The relays employed in the control system include the low voltage relay LV which upon sufficient drop in exciter potential drops out and deenergizes the brake coil thus applying the brake to the motor M and at the same time deenergizes the pattern field RF₂ of the regulator generator, thereby bringing the motor to a stop should the exciter potential drop below a safe operating value. The LV relay may also be deenergized by the overload relay OL and the load capacity relay CR under certain conditions as will be hereinafter noted. A brake relay BR is provided to complete a circuit for releasing the brake upon movement of the master switch in either the heaving in or paying out directions. The jamming relay JR is connected in series with the winch-motor M armature circuit and as previously mentioned under excessive load conditions causing high armature current, picks up and thus increases the excitation of the regulator winding RF₄, by energizing the field with the full voltage drop across the resistor 4. Each of the load sensitive relays 1—SR and 2—SR are also connected in series with the hoist motor armature circuit and respond to currents of predetermined values in this circuit. 1—SR upon operating shunts the last stage of the field control resistor 2 thus increasing the excitation of regulator field RF₃ under certain operating conditions and 2—SR under similar conditions operates to shunt the resistor 3 from the circuit of the hoist motor field MF, thus increasing its excitation and consequently the torque output of the motor. The overload relay OL is preferably of the inverse time delay type and is provided to protect the system against rapidly increasing currents well beyond the range of operation of the jamming relay and which operation of the jamming relay could not expeditiously correct, and also to protect the system against persistent overload conditions which functioning of the jamming relay has not corrected or which are not sufficiently high enough to operate the jamming relay but which the persistence of would have damaging effect upon the system. Its contact members open circuit the coil of the low voltage relay and thereby cause the system to be deenergized and the brake to be set. As an additional safeguard against overloading a load capacity relay CR operable in response to excessive winch torques may be provided as shown in Fig. 4 which takes over control of the system and operates the motor in a given direction at given torque and speed characteristics.

To operate the control system, the main switch S is closed which connects the prime mover P to the source of direct current B, thus driving the exciter E, the regulator generator and the main generator G. When the exciter potential builds up to a predetermined minimum value, the coil of the low voltage relay LV connected across the exciter terminals through the reset switch on the master switch MS is sufficiently energized to pick up the LV relay and close the contacts 14 and 15 thereof. Closing of contact 15 energizes, after turning the master switch, the circuits through the master switch contacts 1—MS and 3—MS for heaving in or 2—MS and 4—MS for paying out, to the regulator pattern field RF₂ the circuits to the coil of brake relay BR, and also the circuits to the coil of the electromagnetic brake B after contact 16 of the brake relay BR closes. Closing of contact 14 establishes a holding circuit for the low voltage relay LV thus locking the coil thereof in the circuit.

Assuming now that the motor is to be driven in the heaving in direction, the master switch MS is moved to position A for heaving in. Thus by contacts 1—MS and 3—MS of the master switch, there is completed a circuit from the bus 17 supplied by the exciter E through contacts 15 of the low voltage relay LV, conductor 18, contact 1—MS of the master switch, junction point 19, the regulator field winding RF₂, junction point 20, contact 3—MS of the master switch and conductor 21 to the opposite bus 22 supplied by the exciter. The regulator field winding RF₂ is, therefore, energized with the full exciter potential of such polarity to drive the winch motor in the direction to heave in. At the same time the circuit to the field RF₂ is completed, a circuit to the coil of the brake relay BR is also completed through master switch contacts 1—MS and 3—MS and may be traced from the junction points 19 and 20 through the coil of brake relay BR. Contact members 16 of the brake relay thus close and complete a circuit through conductor 18 to the coil of the electromagnetic brake B to release the brake and permit operation of the motor M at its lowest speed. It should be noted at this point that in position A of the master switch all of the sections 5, 6, 7, 8, 9 and 10 of the field control resistor 2 remain shunted through the master switch. The differentially wound field RF₃ of the regulator generator, therefore, remains at its maximum value of excitation. Since this field RF₃ is differentially wound with respect to the field RF₂, the flux it produces subtracts from the flux produced by pattern field RF₂ and the main generator field GF is excited at its minimum value for these conditions. If the starting currents in the winch motor M armature circuit are now sufficient, the relays 1—SR and 2—SR may pick up to close their respective contacts 23 and 24. This, however, has no effect upon the system since the resistor section 10 of regulator field control resistor 2 shunted by closure of contacts 23, is already shunted on the master switch and will remain so shunted until the master switch is in position G, and the resistor 3 in the circuit of the motor field winding MF is also shunted by the master switch by contact 11—MS and will remain shunted until the master switch is in its last or H position. The field MF is, therefore, excited at its maximum value by the exciter E to produce a high motor torque.

Should the load on the hoist motor M be relatively light, as the master switch is moved through its successive positions, resistor sections 5, 6, 7, 8, etc., will be successively inserted in the circuit of the field winding RF3 by the opening of master switch contacts 5—MS, 6—MS, 7—MS, 8—MS, etc. This progressively weakens the differential effect of the field RF3 on the field RF2 to increase the excitation of the field GF of the main generator whereby for the established conditions, the motor speed increases.

If, for example, the master switch is now in position G for heaving in, in which position the resistor sections 5, 6, 7, 8 and 9 are inserted in the circuit of the field RF3, a further decrease of the motor armature currents sufficient for the load sensitive relay 1—SR to drop out causes contact members 23 to open and insert the last section 10 of the field control resistor in the circuit of the field RF3 making the generator voltage its maximum value. With the master switch on H and with further weaking of the load current or motor armature current, load sensitive relay 2—SR will trip, opening the contact members 24 and inserting the resistor 3 in the hoist motor field MF. This action is now possible since the shunt circuit through contact 11—MS of the master switch is open in master switch position H. The motor M now operates at the maximum possible speed for the particular load applied thereto and the progressive movement of the master switch from positions A to H causes the motor to operate according to the curves A to H inclusive, as shown in Fig. 2.

The jamming relay JR has been provided to protect the winch machinery and hawser (not shown) from being subject to stresses beyond the capacity of the equipment. This relay, as previously mentioned, also responds to the winch motor M armature current, however, the current must rise to a considerably higher value than that required for the operation of the load sensitive relays 1—SR and 2—SR as graphically illustrated in Fig. 3 wherein an approximate proportioning of the currents required to operate these relays is shown. In the event that an overcapacity load has begun to be moved, the winch motor armature currents rapidly increase picking up the load sensitive relays 1—SR and 2—SR to shunt their respective resistors 10 and 3. Under these conditions the currents further increase until a value is reached sufficient to operate the jamming relay JR. This opens the back contact members 25 thereof which normally shunt a portion of the resistor 4 and closes the front contact members 26 of this contact assembly to connect the field winding RF4 completely across the field control resistor 4 in the circuit of the motor armature. Since the regulator field RF4 is differentially wound with respect to the pattern field RF2, and it is excited in proportion to the voltage drop across the resistor 4, its excitation is increased with this operation which decreases the excitation of the main generator field GF, and consequently reduces the torque output of the motor in the manner illustrated in the dotted curves A' to H' of Fig. 2. For the particular operating characteristics indicated by this set of curves, the preferred percent of torque under motoring conditions on the motor shaft necessary for the jamming relay to operate is also shown. It may happen, however, that the load will be such that the motor is driven in the pay-out direction even though the master switch is held in the heaving in position. In this case the hawser pull will have to overcome the friction of the winch in addition to the motor torque, thus reducing or limiting the paying out speed of the load to a safe value. The specific operating characteristics of the motor under such conditions are illustrated by the group of curves to the left of the zero torque axis in Fig. 2. With ordinary overload protection, this protective feature would be absent. During operation of the jamming relay JR the field discharge resistor 4a prevents the field RF4 from being open circuited.

In the event that sharply increasing armature currents should occur of a nature which would damage the system before the action of the jamming relay could take effect to relieve the load and thus reduce the currents, the overload relay OL quickly acts to open its contact members 27. This open circuits the coil of the LV relay causing it to drop out and open its control members 14 and 15. Opening of contact member 15 deenergizes the BR relay causing its contact members 16 to open, thus deenergizing the brake relay B and applying the brake. The overload relay also functions to protect the system from persistent minor overloading which remains uncorrected after the jamming relay JR has operated. Fig. 3 graphically illustrates the preferred functioning of the jamming relay and the overload relay in the system.

It is believed unnecessary to set forth a detailed description of the function of the control system for the paying out operation since such considerations are analogous to the heaving in operation. An inspection of the master switch MS indicates that the control of the field control resistor 2 in the circuit of the regulator field RF3 is not changed because of the symmetrical construction of the master switch contacts 5—MS and 10—MS controlling this operation. Likewise in the case of overhauling loads in paying out direction, with the motor operating as a generator, increases in motor armature current will cause operation of the load sensitive relays 1—SR and 2—SR to respectively decrease the output of the main generator and strengthen the motor field MF, thereby reducing the speed of the winch to a safe paying out value. The jamming relay JR in a manner similar to that of heaving in would also function under paying out conditions to reduce motor torque. The required currents however, during motoring in a paying out direction are unlikely, if ever, encountered and during overhauling the load sensitive relays operate and provide under all but the most extreme conditions the necessary control of the motor. The only substantial difference in the operation of the system in paying out from that of heaving in being that the polarity of the regulator pattern field RF2 is reversed through the master switch contacts 2—MS and 4—MS to drive the motor in the paying out direction.

The set of curves illustrated in Fig. 2 graphically indicate the torque and speed characteristics of a motor controlled in accordance with this invention teachings for both motoring and overhauling conditions. The curves apply to motoring and overhauling characteristics for both heaving in and paying out direction of motor operation.

It will be noted that these curves are lettered consecutively A to H, that curve F is also lettered F-G-H and that curve G is also lettered G-H. Each of these characters corresponds to a given position, in either hoisting or lowering of the master switch and as such indicate the particular torque-speed characteristic of the motor for any given master switch position. Portions of the curve to the right of the ordinate axis represent motoring characteristics and portions of the curves to the left of this axis represent overhauling characteristics.

Considering the first six curves, that is, curves A to F, it will be noted that these curves represent the operating characteristics when the motor is driving a heavily loaded winch. This will probably be more clearly understood by referring again to Fig. 1. Under heavily loaded operating conditions, the armature currents of the winch motor are relatively high and remain high during the heaving in operation. Consequently, the load sensitive relays 1—SR and 2—SR pick up and remain picked up during the operation. Thus, when the master switch is progressively advanced from one step to the next, the operating characteristics progressively shift from one curve in Fig. 2 to the next up to and including position F of the controller. In view of the fact that load sensitive relay 1—SR is up and the contact 23 thereof closed, advancement of the master switch to position G which opens the shunt circuit around field control resistor section 10 has no effect upon the regulator differential field RF3, since this resistor section is still shunted by the shunt circuit established by the closed contact 23 of the relay 1—SR. Accordingly, the curve F represents the operating characteristic of the motor under the assumed heavy load condition for master switch position G. Movement of the master switch to position H opens the shunt circuit around the motor field resistor 3 established by the master switch, however since high armature currents are still holding load sensitive relay 2—SR up and contact 24 thereof closed, a shunt circuit still remains around the motor field resistor 3 and no change in the excitation of the motor field MF occurs. Hence, curve F also represents the operating characteristics of the motor under heavy load conditions for position H of the master switch. This curve is, therefore, in addition to being lettered F, also lettered FG-H and indicates motor operating characteristics for a heavily loaded winch.

If now the assumed load conditions are such that the armature currents have decreased sufficiently to allow load sensitive relay 1—SR to drop out but not 2—SR, during advancement of the master switch in the heaving in direction, it will be noted that movement of the master switch from position F to position G inserts the resistor section 10 in series with the regulator differential field RF3 since the contact 23 is now open, thereby giving the operating characteristic indicated by curve G. However, since a shunt circuit around motor field resistor 3 remains closed by contact 24 of relay 2—SR further movement of the master switch to position H causes no change in the excitation of the motor field MF and the operating characteristics remain the same as for position H. Hence, this curve, in addition to being identified as G, is also identified as G-H and denotes, for example, motor operating characteristics for a medium load. If the assumed load is relatively light, advancement of the master switch from positions A to H, as previously described, produces motor operating characteristics indicated by the curves A to H inclusive.

In the event that the winch friction and gear ratio are such that a reversal of rotation by the hawser pull will result in hawser stresses or winch stresses beyond safe limits, a tensiometer control of the type generally indicated at 33 in the circuit modification of Fig. 4 may be substituted for or used in addition to the jamming relay JR. In this circuit the function of the motor generator equipment, the function of the master switch control of the regulator field RF3, the function of the load sensitive relays 1—SR and 2—SR, the function of the jamming relay JR and the overload relay OL remains unchanged. In the absence of the jamming relay, the other circuit elements function as previously described and the regulator field RF4 is preferably energized by the voltage drop across the entire resistor 4 and will now vary in excitation only in the amount indicated by the varying voltage drops thereacross caused by varying motor armature currents. Its differential effect with respect to the pattern field RF2, however, would not be changed. In this figure, parts similar to those of Fig. 1 have been assigned like reference characters.

As will be noted from Fig. 4, the motor shaft 34 drives a spur gear 35 coaxially mounted with respect to the hawser drum 36. The torque of this gear is transmitted to the drum through the medium of a plurality of intermediate or planetary gears 37 which engage an internally toothed ring gear 37a secured to rotate the hawser drum. The planetary gears are relatively supported and positioned by means of a coaxially pivoted plate 38 having a torque or reaction arm 39 secured thereto. Rotative movements of this plate and planetary gear assembly upon torque transmission through the assembly are limited by the bias of the compression springs 40 and 41 which are disposed in opposed relationship to bias the torque arm 39 to a normal neutral position. A limit switch LS having a movable contact 42 carried by the torque arm and a stationary contact 43 is provided to control energization of the coil of the load capacity relay CR. As the torque arm is slightly moved by excessive torques transmitted in a hoisting direction, the contacts 42 and 43 engage to energize the load capacity relay CR which is thus connected across the exciter terminals through the busses 17 and 22. Operation of the CR relay accomplishes the following:

1. Front contact of transfer contact 44 bypasses master switch contacts 5—MS to 10—MS.
2. Back contact of transfer contact 44 interrupts the coil circuit of the LV relay.
3. Contact members 45 bypass contact 15 of the LV relay.
4. Front contact members of transfer contact members 46 bypass master switch contact 2—MS.
5. Back contact members of transfer contact members 46 open circuit master switch contact 3—MS.
6. Front contacts of transfer contact members 47 bypass master switch contact 4—MS.

7. Back contacts of transfer contact members 47 open circuit master switch contact 1—MS.

Assuming an overload condition and the master switch set in position F for heaving in, the limit switch LS closes and actuates relay CR. The front contact of transfer contact 44 of relay CR upon closing and bypassing the master switch contacts 5—MS and 10—MS, shunts the regulator field control resistor sections 5 to 10, inclusive, thereby reducing the generator voltage and motor torque to a minimum value. The back contact of contact 44 deenergizes the low voltage relay LV allowing it to drop out opening its contacts 14 and 15, thus disconnecting the regulator pattern field RF2, from its connection to the exciter busses 17 and 22 through the master switch. At the same time contacts 45, front contacts of transfer contact members 46, front contacts of transfer contact members 47 make to hold the brake relay BR in and its contact 16 closed. Since contact 15 is bypassed by the contact 45, the circuit to the electromagnetic brake B through the BR relay contact members 16 is not interrupted and the brake is held in the off position. Closing of the front contacts of transfer contact members 46 and 47 also reverses the polarity of the pattern field RF2, thus driving the motor at its lowest speed in the lowering direction in accordance with the operating characteristic of curve A. If the jamming relay is used in the circuit with the tensiometer control, the motor would operate in accordance with curve A'.

If the master switch is now moved to any of the heaving in or paying out positions, no effect will be had upon the tensiometer control of the system, since the conductors leading to the contact sections 2—MS and 4—MS are bypassed by the front contact members of the transfer contacts 46 and 47 and the contact sections 1—MS and 3—MS are open circuited by the back contact members of the transfer contact members 46 and 47. Likewise, the LV relay coil will remain deenergized even though the master switch is in its neutral position with the reset contact closed, since the back contacts of transfer contact members 44 in series with the LV relay coil are open.

As the hawser tension or winch load decreases, the torque or reaction arm 39 rotates to open the contacts 42 and 43. Relay CR, therefore, drops out and reestablishes the circuits for normal operation. Opening of the contact members 46 deenergizes the coil of the BR relay allowing contact members 16 thereof to open. This deenergizes the coil of the relay B and sets the brake. To regain control of the system by the master switch, it is necessary to position the master switch in its neutral position at which time the reset contact member thereof is closed and the LV relay coil energized. The LV relay then picks up to establish its holding circuit through contact members 14 and 44 and 27 and establishes a circuit through its contact members 15 which upon operation of the master switch and consequently operation of the BR relay, completes a circuit through the contact members 16 of the BR relay to the brake relay B to release the brake.

From the foregoing it is apparent that the disclosed motor control systems are particularly adapted for use in connection with motors driving towing winches. For example, during towing operations when the master switch is positioned for heaving in, if hawser stresses should occur causing overload conditions of the control systems, the function of the load sensitive relay 1—SR for master switch position G and the function of the load sensitive relay 2—SR for master switch position H tend to control the speed of heaving in within safe values. Should hawser stresses or pull still be overloading, the system, the jamming relay will then operate to produce a measurable reduction in motor torque thereby either reducing the rate of heaving in or if the load is sufficient allowing the motor to be overhauled. The overload relay OL under such conditions functions to prevent persistent dangerous overloading. The tensiometer control illustrated in Fig. 4 provides still further protection against unusually high loads by reversing the direction of rotation of the motor to pay out cable until such condition is relieved. In short, the control system provides adequate control for all conditions of operation and functions to regulate the heaving in and paying out operations of the winch in the most expeditious manner for the specific conditions.

It should also be noted, however, that the mere omission of the jamming relay in Fig. 1 provides a control for the motor which is particularly adapted to drive winches of the type used in hoists. In this connection, it is to be clearly understood that the present invention comprehends the combination of the overload relay OL and the load sensitive relays 1—SR and 2—SR in control systems of the character disclosed. In such an application an instantaneous trip overload relay is preferably used in place of the inverse time delay relay. As previously mentioned, in connection with the description relating to Fig. 4, no change in the function of the other elements of the combination occurs by such an omission of the jamming relay. The system would thus provide motor torque speed characteristics as indicated by the solid curves A to H of Fig. 2 with the maximum attainable motor speeds still regulated by the relays 1—SR and 2—SR in the manner previously described. In this particular application in the absence of the jamming relay, the differential field RF4 is again preferably energized by the voltage drop across the entire resistor 4. It is further clearly understood that other elements than the jamming relay may be omitted from the disclosed combination and that other arrangements of the elements thereof may be made. However, such are believed to be clearly within the scope of this invention as the results of such combinations may be predicted from the teachings hereinbefore made.

It may now be seen that the present invention utilizes to good advantage all of the generating equipment in the disclosed direct current variable voltage control system for a motor. The novel arrangements and control of the field windings of the generating equipment utilizes to the fullest advantage the variable electrical quantities of the motor armature circuit and the variable mechanical reactions provided by winch loading, to effect a control and provide such protection from overload which responds to preselected conditions with a degree of accuracy hitherto unobtainable, and which further provides a positive control of the hoist motor under all conditions of operation.

The specific showings made in the drawings and the descriptive disclosure hereinbefore made are merely illustrative of the principles of this invention and are not to be interpreted in a limiting sense. The only limitations are to be determined from the scope of the appended claims.

I claim as my invention:

1. A motor control system comprising, in combination, a direct current motor having an armature winding and a field winding, a main generator having an armature winding connected in series with the motor armature winding, a separately excited field winding for the main generator, a regulating generator disposed to excite the main generator separately excited field winding, a constant source of power, field windings for the regulating generator so connected that they are excited in proportion to the regulating generator voltage and the constant source of power, a regulating field winding excited in proportion to the main generator voltage and another regulating field winding excited in proportion to the main generator current, means for regulating the degree of excitation of the regulating field winding excited in proportion to the main generator voltage and means responsive to currents in the motor armature circuit for controlling the minimum degree of excitation of said regulating field winding excited in proportion to the main generator voltage.

2. A motor control system comprising, in combination, a direct current motor having a field winding and an armature winding, a source of direct current for energizing the motor field winding, a main generator having an armature winding connected in series with the motor armature winding, a field winding for said main generator, a regulating generator having an armature winding and a series field winding, said armature and series field winding being connected in series circuit relation with said main generator field winding, said regulating generator also having a pattern field winding, a first differential field winding and a second differential field winding, said differential field windings being connected in opposition to the pattern field winding, said pattern field winding being energized by said source of direct potential, said first differential field winding being excited by the potential of said main generator, said second differential field winding being excited in proportion to currents of the motor armature, means for controlling the polarity of said pattern field winding, means for varying the excitation of said first differential field winding, means for determining the minimum value of excitation of the first differential field winding, means for controlling the degree of excitation of the motor field winding, means for controlling the value of excitation of the second differential field winding, and means for controlling the polarity of said pattern field winding and for controlling the excitation of said first differential field winding exclusive of said means for reversing the polarity of said pattern field winding and said means for controlling the degree of excitation of said first differential field winding.

3. A motor control system comprising, in combination, a direct current motor having an armature winding and a field winding, a source of potential for energizing said field winding, a generator having an armature winding connected to the armature winding of said motor, a field winding for said generator, a source of direct current potential for exciting the generator field winding, means for reversing the polarity of said source of direct current whereby the excitation of said generator field winding is reversed and consequently the motor rotation reversed, means for varying the potential of said source of direct current and means responsive to predetermined values of current in the motor armature circuit for determining the maximum value of potential of said direct current source which may be effected by said means for varying the potential thereof.

4. A motor control system comprising, in combination, a direct current motor having an armature winding and a field winding, a resistor in series with the motor field winding, a source of potential for energizing the motor field winding, a generator having an armature winding connected in series with the motor armature winding, a field winding for said generator, a source of direct current potential for exciting the generator field winding, means for reversing the polarity of said source of direct current whereby the excitation of said generator field winding is reversed and the operation of said motor reversed, means for varying the potential of said source of direct current, means responsive to motor armature currents of a predetermined value for determining the maximum value of potential of said source of direct current which may be effected by said means for varying the potential thereof, means responsive to motor armature currents of a predetermined value for controlling the degree of excitation of said motor field winding, means responsive to excessive motor armature currents for measurably reducing the potential of said source of direct current, and means responsive to excessive motor torques for establishing a predetermined polarity and potential of said source of direct current.

5. A system of control for a direct current motor comprising, in combination, a direct current motor having an armature winding and a field winding, a source of potential for energizing said field winding, a generator having an armature winding connected to said motor armature winding, a field winding for said generator, a source of direct current potential for exciting said generator field winding, means for reversing the polarity of said source of direct current for effecting reversing of said motor, means for varying the potential of said source of direct current, means responsive to a predetermined value of motor armature current for limiting the maximum value of potential of said source of direct current which may be effected by said means for varying the potential of said source, means responsive to excessive motor torques adapted to shunt said means for reversing the polarity of said direct current source and establish a predetermined polarity thereof and also adapted to shunt said means for varying the potential of said source whereby said motor is operated in a given rotational direction at predetermined torque and speed characteristics.

6. A system of control for a direct current motor comprising, in combination, a direct current motor having an armature winding and a field winding, a source of potential for energizing said field winding, a generator having an armature winding connected to said motor armature winding, a field winding for said generator, a source of direct current potential for exciting said generator field winding, means for reversing the polarity of said source of direct current for reversing the excitation of said generator field winding whereby the direction of rotation of said motor is reversed, means for varying the potential of said source of direct current, means responsive to motor armature currents of a predetermined value for determining the maximum value of potential of said source of direct current which may be effected by said means for varying the potential of said source of direct current, and means responsive to excessive motor armature currents for effecting a measurable decrease of potential of said source of direct current.

7. A motor control system comprising, in combination, a motor having an armature winding and a field winding, a source of potential for energizing said field winding, a main generator having an armature winding connected in series with the armature of said motor, a field winding for said main generator, a second generator having a plurality of field windings, said main generator field winding being excited by the output of said second generator, one of said second generator field windings being connected to said source of constant potential, means for reversing the polarity of said field winding, said field winding being adapted to increase the output of said second generator and effect reversing of said motor upon reversing of the polarity thereof, another of the field windings of said second generator being connected in opposition to said first mentioned second generator field winding and excited by the output of said main generator, means for controlling the excitation of said field winding connected in opposition whereby the speed of said motor is regulated, means responsive to predetermined motor armature currents for controlling the minimum degree of excitation of said field winding connected in opposition, a second field winding also connected in opposition to said first mentioned second generator field winding being excited in proportion to motor armature currents, means for increasing the excitation of the second mentioned field winding connected in opposition in response to excessive motor armature currents, and means responsive to a predetermined value of motor armature currents for determining the minimum value of excitation of said motor field winding.

8. A motor control system comprising, in combination, a motor having an armature winding and a field winding, a source of constant potential for exciting said field winding, a main generator having an armature winding and a separately excited field winding, the armature of said main generator being connected in series with the armature of said motor, a second generator having an armature winding and a series field winding, said separately excited main generator field winding being connected in series with said series field winding and the armature of said second generator, said second generator also having a first differential field winding, a second differential field winding and a pattern field winding, said pattern field winding being energized from a source of constant potential and being adapted to increase the output of said second generator whereby the excitation of said separately excited field winding of said main generator is increased and the speed of said motor increased, means for controlling the polarity of said pattern field winding for effecting reversing of said motor, said differential field windings being opposed to said pattern field winding for controlling the effect of said pattern field on said second generator, said first differential field winding being excited by the potential of said main generator and having a control resistor in series therewith, means for shunting portions of said resistor for controlling the excitation of said first differential field winding and thereby regulating the motor speed, means responsive to predetermined motor armature currents operable on said control resistor for determining the minimum degree of excitation of said first differential field winding, said second differential field winding being excited in proportion to the motor armature currents, and means responsive to excessive motor armature currents for measurably increasing the excitation of said second differential field winding whereby the speed of said motor is decreased.

9. A motor control system comprising, in combination, a motor having an armature winding and a field winding, a source of constant potential for exciting the motor field winding, a main generator having an armature winding and a field winding, said main generator armature winding and said motor armature winding being connected in series circuit relationship, a second generator having an armature winding and a series field winding, said main generator field winding being connected in series circuit relation with the armature winding and the series field winding of said second generator, said second generator also having a first differential field winding, a second differential field winding and a pattern field winding, said pattern field winding being connected to said source of constant potential and being adapted to increase the output of said second generator and increase the speed of said motor and also being adapted to effect reversing of said motor upon a reversing of the polarity thereof, means for reversing the polarity of said pattern field winding, said differential field windings being connected in opposition to said pattern field winding for controlling the effect of said pattern field on said second generator, said first differential field winding being connected across the armature terminals of said main generator and having a field control resistor in series therewith, means normally shunting portions of said field control resistor for progressively inserting said portions in series with said first differential field winding whereby its excitation is decreased, means responsive to predetermined values of motor armature current operating on said field control resistor for determining the minimum value of excitation of said first differential field winding, a resistor in series circuit with said motor armature and said main generator armature, said second differential field winding being excited by the voltage drop across said resistor which varies with the motor armature current, means normally shunting a portion of said resistor responsive to excessive motor armature currents for inserting the full resistor in the circuit whereby the excitation of said second differential field winding is increased to decrease the output of said second generator and thus decrease the motor speed, a resistor in circuit with the field winding of said motor, and means responsive to predetermined motor armature currents for shunting said motor field winding resistor whereby the minimum value of excitation of said motor field winding is determined.

10. A motor control system comprising, in combination, a motor having an armature winding and a field winding, a source of constant potential for exciting the motor field winding, a main generator having an armature winding and a field winding, said main generator armature winding and said motor armature winding being connected in series circuit relationship, a second generator having an armature winding and a series field winding, said main generator field winding being connected in series circuit relation with the armature winding and the series field winding of said second generator, said second generator also having a first differential field winding, a second differential field winding and a pattern field winding, said pattern field winding being connected to said source of constant potential and being adapted to increase the output of said second generator and increase the speed of said motor and also being adapted to effect reversing of said motor upon a reversing of the polarity thereof, means for reversing the polarity of said pattern field winding, said differential field windings being connected in opposition to said pattern field winding for controlling the effect of said pattern field on said second generator, said first differential field winding being connected across the armature terminals of said main generator and having a field control resistor in series therewith, means normally shunting portions of said field control resistor for progressively inserting said portions in series with said first differential field winding whereby its excitation is decreased, means responsive to predetermined values of motor armature current operating on said field control resistor for determining the minimum value of excitation of said first differential field winding, a resistor in series circuit with said motor armature and said main generator armature, said second differential field winding being excited by the voltage drop across said resistor which varies with the motor armature current, means normally shunting a portion of said resistor responsive to excessive motor armature currents for inserting the full resistor in the circuit whereby the excitation of said second differential field winding is increased to decrease the output of said second generator and thus decrease the motor speed, a resistor in circuit with the field winding of said motor, means responsive to predetermined motor armature currents for shunting said motor field winding resistor whereby the minimum value of excitation of said motor field winding is determined and means responsive to excessive motor torques for controlling the polarity of said pattern field winding and effecting the maximum degree of excitation of said first differential field winding exclusive of said means for reversing the polarity of said pattern field winding and said means normally shunting the portions of the field control resistor.

KURT MAHNKE.